(12) United States Patent
Turányi et al.

(10) Patent No.: US 11,960,940 B2
(45) Date of Patent: Apr. 16, 2024

(54) PERFORMANCE OF FUNCTION AS A SERVICE

(71) Applicant: Telefonaktiebolaget LM Ericsson (publ), Stockholm (SE)

(72) Inventors: Zoltán Turányi, Szentendre (HU); Dániel Géhberger, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 655 days.

(21) Appl. No.: 17/059,330

(22) PCT Filed: May 29, 2018

(86) PCT No.: PCT/SE2018/050538
§ 371 (c)(1),
(2) Date: Nov. 27, 2020

(87) PCT Pub. No.: WO2019/231364
PCT Pub. Date: Dec. 5, 2019

(65) Prior Publication Data
US 2021/0149742 A1 May 20, 2021

(51) Int. Cl.
*G06F 9/50* (2006.01)
*G06F 8/61* (2018.01)
*H04L 67/51* (2022.01)

(52) U.S. Cl.
CPC ............ *G06F 9/5077* (2013.01); *G06F 8/61* (2013.01); *G06F 9/5027* (2013.01); *H04L 67/51* (2022.05)

(58) Field of Classification Search
None
See application file for complete search history.

(56) References Cited

U.S. PATENT DOCUMENTS

| | | | | |
|---|---|---|---|---|
| 9,176,716 | B2 * | 11/2015 | Mattheis | G06F 9/46 |
| 9,276,987 | B1 * | 3/2016 | Sirota | G06F 9/5033 |
| 10,642,648 | B2 * | 5/2020 | Ling | G06F 9/465 |
| 10,831,550 | B2 * | 11/2020 | Vadapandeshwara | G06F 9/5044 |
| 2001/0037322 | A1 * | 11/2001 | Lindsay | G06F 16/24557 |
| 2004/0103119 | A1 * | 5/2004 | Fukui | G06F 3/0238 |

(Continued)

FOREIGN PATENT DOCUMENTS

| | | |
|---|---|---|
| CN | 104583948 A | 4/2015 |
| CN | 104639614 A | 5/2015 |

(Continued)

OTHER PUBLICATIONS

EPO Communication Pursuant To Article 94(3) EPC issued for Application No. 18 732 166.6-1203—Aug. 2, 2022.

(Continued)

*Primary Examiner* — Hiren P Patel
(74) *Attorney, Agent, or Firm* — Baker Botts L.L.P.

(57) ABSTRACT

A FaaS system comprises a plurality of execution nodes. A software package is received in the system, the software package comprising a function that is to be executed in the FaaS system. Data location information related to data that the function is going to access during execution is obtained. Based on the data location information, a determination is then made of an execution node in which the function is to be executed. The function is loaded into the determined execution node and executing in the determined execution node.

18 Claims, 4 Drawing Sheets

(56) References Cited

U.S. PATENT DOCUMENTS

| | | | | |
|---|---|---|---|---|
| 2007/0143759 | A1* | 6/2007 | Ozgur | G06F 9/5033 718/102 |
| 2012/0284704 | A1* | 11/2012 | Friedman | G06F 9/4451 717/177 |
| 2013/0166514 | A1* | 6/2013 | Schultz | G06F 16/137 707/690 |
| 2013/0263140 | A1* | 10/2013 | Eriksson | G06F 9/4843 718/102 |
| 2016/0191509 | A1* | 6/2016 | Bestler | H04L 63/0876 713/193 |
| 2017/0235501 | A1* | 8/2017 | Luo | G06F 3/0604 709/201 |
| 2018/0329692 | A1* | 11/2018 | Kimura | G06F 8/36 |
| 2018/0349212 | A1* | 12/2018 | Liu | H04L 67/62 |
| 2018/0375712 | A1* | 12/2018 | Kröhling | H04L 67/563 |
| 2019/0044886 | A1* | 2/2019 | Bernat | H04L 49/205 |
| 2019/0079805 | A1* | 3/2019 | Sakurai | G06F 9/4881 |
| 2019/0166221 | A1* | 5/2019 | Shimamura | G06F 9/5072 |
| 2019/0188049 | A1* | 6/2019 | Choudhary | G06F 9/5016 |
| 2019/0199690 | A1* | 6/2019 | Klein | H04L 63/0428 |
| 2019/0339955 | A1* | 11/2019 | Kuo | G06F 9/485 |
| 2020/0310828 | A1* | 10/2020 | Turull | G06F 9/547 |
| 2021/0049070 | A1* | 2/2021 | Gustafsson | G06F 12/08 |

FOREIGN PATENT DOCUMENTS

| | | |
|---|---|---|
| CN | 107807859 A | 3/2018 |
| WO | 2017 207049 A1 | 12/2017 |

OTHER PUBLICATIONS

Hightower, Kelsey et al.; Kubernetes: Up and Running, Dive into the Future of Infrastructure—2017.
Dal: a Locality-Optimizing Distributed Shared Memory System by Gabor Nemeth et al.—2017.
Function as a Service—From Wikipedia, the free encyclopedia—downloaded on Nov. 26, 2020.
Hyperdex: a Distributed, Searchable Key-Value Store by Robert Escriva et al., Helsinki, Finland—Aug. 13-17, 2012.
Key-Value Database—From Wikipedia, the free encyclopedia—downloaded on Nov. 26, 2020.
Load-Balanced and Locality-Aware Scheduling for Data-Intensive Workloads at Extreme Scales by Ke Wang et al.; Concurrency and Computation: Practice and Experience—2015.
PCT International Search Report issued for International application No. PCT/SE2018/050538—dated Mar. 19, 2019.
PCT Written Opinion of the International Searching Authority issued for International application No. PCT/SE2018/050538—dated Mar. 19, 2019.
Jeff Nickoloff "Docker in Action"—2016.
Gustavo Totoy et al., An Extensible Scheduler for the OpenLambda FaaS Platform—Mar. 2018.
Cristina L. Abad et al., "Package-Aware Scheduling of FaaS Functions", HotCloudPerf Workshop, ICPE '18 Companion, Apr. 9-13, 2018, Berlin Germany.
EPO Summons to Attend Oral Proceedings issued for Application No. 18 732 166.6-1203—Mar. 13, 2023.
Office Action issued for Chinese Application Serial No. 201880095818.2—dated Nov. 24, 2023.

* cited by examiner

*Fig. 4*

PERFORMANCE OF FUNCTION AS A SERVICE

PRIORITY

This nonprovisional application is a U.S. National Stage Filing under 35 U.S.C. § 371 of International Patent Application Serial No. PCT/SE2018/050538 filed May 29, 2018 and entitled "IMPROVED PERFORMANCE OF FUNCTION AS A SERVICE" which is hereby incorporated by reference in its entirety.

TECHNICAL FIELD

Embodiments herein relate to a method performed by a function as a service (FaaS) system, the FaaS system comprising a plurality of execution nodes, a computer system, a computer program and a carrier.

BACKGROUND

Function as a Service (FaaS) is an emerging cloud computing paradigm often also called serverless computing. In the traditional "serverful" paradigm the programmer creates a server that is then started in the cloud and runs for a long period of time receiving and serving requests. In contrast, FaaS is serverless and the programmer merely specifies a function (or procedure) with a trigger and when the trigger fires, the cloud executes the function. This allows the programmer to focus exclusively on the task at hand (i.e. what the function actually does) and frees him/her from writing the wrapper (e.g. event reception, queuing, event loops, load balancing, scaling) around the function.

Functions do not keep state between executions, but rather read data from a database, do the work and write the result back to the database. This is called state externalization and can be applied to serverful computations. It is useful for scaling and failover—the worker process actually working on the data keeps no long-living state, so in case it fails, it is easy to start a new worker process, which would have the same access to the data as the failed process. If, in contrast, the data would have been encapsulated in the worker process, it would have been lost on the crash of the worker. Similarly, if due to scaling the computation load has to be distributed differently between worker processes, it is necessary to write software code to exchange the relevant contexts between the workers if they encapsulate the data. With externalized data rearranging which (and how many) workers work on which data is easy. Functions do not store data for long almost by definition, since they do not live long. Thus, serverless systems use state externalization by default.

Functions can easily run in several copies at the same time (each responding to a different trigger fire). In FaaS the programmer does not know exactly where its function is executed. Typically, the cloud system distributes the copy of the function to a set of execution nodes in the form of server blades each of which becomes capable of running the function. At trigger time, the cloud system selects one, usually in a round-robin fashion, and executes the function.

FaaS services are in use today. Providers of cloud computing such as Amazon, Google and Microsoft offer such services (e.g. Lambda, Google Functions and Azure Functions). Typically, the trigger is a request to a uniform resource locator (URL), a change in a database, a timer or some other system event. Usually the service is charged by how much a function ran (rounded up to e.g., 100 ms) and there can be a significant delay between the trigger and the execution of the function (e.g. 100-1000 ms). This prevents the decomposition of complete applications and porting them to FaaS, as the interactions between the functions comprising the application would be too slow.

The FaaS principle can be implemented faster, for example by the use of in-memory databases where the change of a value results in a notification in a few microseconds (1-2 μs) if the two processes are on the same server blade or 10-20 μs if they are separated by a single Ethernet hop between server blades. (That is, interaction with a database where one function is writing to a key—triggering another function listening to that key.) If function execution is almost this quick in response to a changed value, it becomes possible to build entire applications as interacting function instances.

Databases in the form of in-memory key-value stores (KVS) usually run in a distributed way in a cloud environment on several server blades for scalability. These server blades can be organized in two main ways. One way (most common) is that the database calculates a hash of the key and uses it to determine in which available server blade the data should be stored. This allows quick access by all server blades, as it is easily calculable where the data resides, just by knowing the key. A drawback of this method is that data is essentially distributed in a random fashion. Even data that is related (e.g. data that is always used together by the application) can be at very different locations if stored under a different key name.

Another way to organize a key-value store is to maintain a mapping between keys and data locations (usually stored also in a distributed way, by hashing the keys). This has a drawback that any function that require access to data has to first look up the mapping to get where the data is located. On the other hand, once this lookup is complete, data access is just as fast as in the previous method. Furthermore, this allows movement of the data to wherever it is best located, which can help making subsequent data access faster (if the data is moved to where it is most often used). However, the data migration capability of this second method is not sufficient if there are multiple dominant accessors reading or writing the data on different server blades. In this case there is no good location for the data as no matter where it is placed, some other process accessing the data will be on another server blade.

An example of a prior art publication is the international patent application publication WO 2017/207049, which discloses monitoring of data transmissions between a plurality of resources at a node of a network. A pattern in the monitored data transmissions is identified and distribution of resources at the node of the network is adapted based on the identified pattern in the monitored data transmissions.

SUMMARY

In view of the above, an object of the present disclosure is to overcome drawbacks related to the performance of function execution in a FaaS system.

This object is achieved in a first aspect by a method performed by a FaaS system, the FaaS system comprising a plurality of execution nodes. The method comprises receiving a software package, which comprises a function that is to be executed in the FaaS system. Data location information related to data that the function is going to access during execution is obtained. Based on the data location information, a determination is then made of an execution node in which the function is to be executed. The function is loaded into the determined execution node and executing in the determined execution node.

The determination of an execution node in which the function is to be executed may comprise determining that the execution node is a node in which data that the function is going to access during execution is located, alternatively that the execution node is a node in which at least one process is executing and is accessing the data that the function is going to access during execution.

In other words, such a method recognizes that in a FaaS context there are no long-lived accessors, but short-lived function instances that do not keep state information and data between executions. The drawbacks related to this fact are at least mitigated in that each time the function is executed in the FaaS system, the FaaS system selects where it is executed. Functions that are accessing the same data are thereby controlled to execute on the same execution node (e.g. server blade) as much as possible. Having obtained the location information related to the data the function is going to access during its execution enables the FaaS system to execute the function close to this data or to other processes (i.e. other functions or instances of the same function) using this data. An advantage of such a method is a fast interaction between functions. This enables decomposing software applications to a set of interworking functions. A programmer would not have to consider distribution as the cloud system (i.e. FaaS system) will arrange the data and execution of functions always close to each other resulting in little wait for data.

In various embodiments, the software package comprises information related to a trigger for the function. In such embodiments, the step of obtaining data location information may comprise calculating, using the information related to a trigger, a set of one or more keys for retrieving values from a key-value store during the execution of the function. The key-value store is then queried, using the calculated set of one or more keys, for the data location information.

In other words, information related to a trigger for the function may be provided (e.g. by a programmer of the function software) in the form of a manifest for a function that is used for calculating some or all keys that the function will access during execution. Such a manifest may be in the form of various data structures as will be exemplified in more detail in the following detailed description.

In various embodiments, the step of obtaining data location information comprises a reception of a set of one or more keys for retrieving values from a key-value store during the execution of the function. The key-value store is then queried, using the received set of one or more keys, for the data location information.

In other words, in such embodiments a set of keys for accessing the key-value store are provided when the function is activated as part of the activation procedure.

In various embodiments, information regarding which keys the function uses during the execution is recorded during the execution of the function. In such embodiments, the step of obtaining data location information comprises retrieving information regarding which keys the function has used during previous executions. The retrieved information regarding which keys the function has used during previous executions is analyzed, and the key-value store is queried, using a result of the analysis, for the data location information.

In other words, "historical" information about which keys the function has used during previous executions is used to predict which key or keys the function will use during the execution.

In a further aspect there is provided a computer system comprising a plurality of server blades, each server blade comprising a processor and a memory. The memory contains instructions executable by the processor whereby the computer system is operative to perform the method as summarized above in connection with the first aspect.

In a further aspect there are provided computer programs comprising instructions which, when executed on at least one processor cause a processor to carry out any method according to the aspects described above. In yet a further aspect there is provided a carrier comprising such a computer programs, wherein the carrier is one of an electronic signal, an optical signal, a radio signal and a computer readable storage medium.

These further aspects and embodiments of these further aspects provide the same effects and advantages as summarized above in connection with the method of the first aspect.

DETAILED DESCRIPTION

Figure 1A:
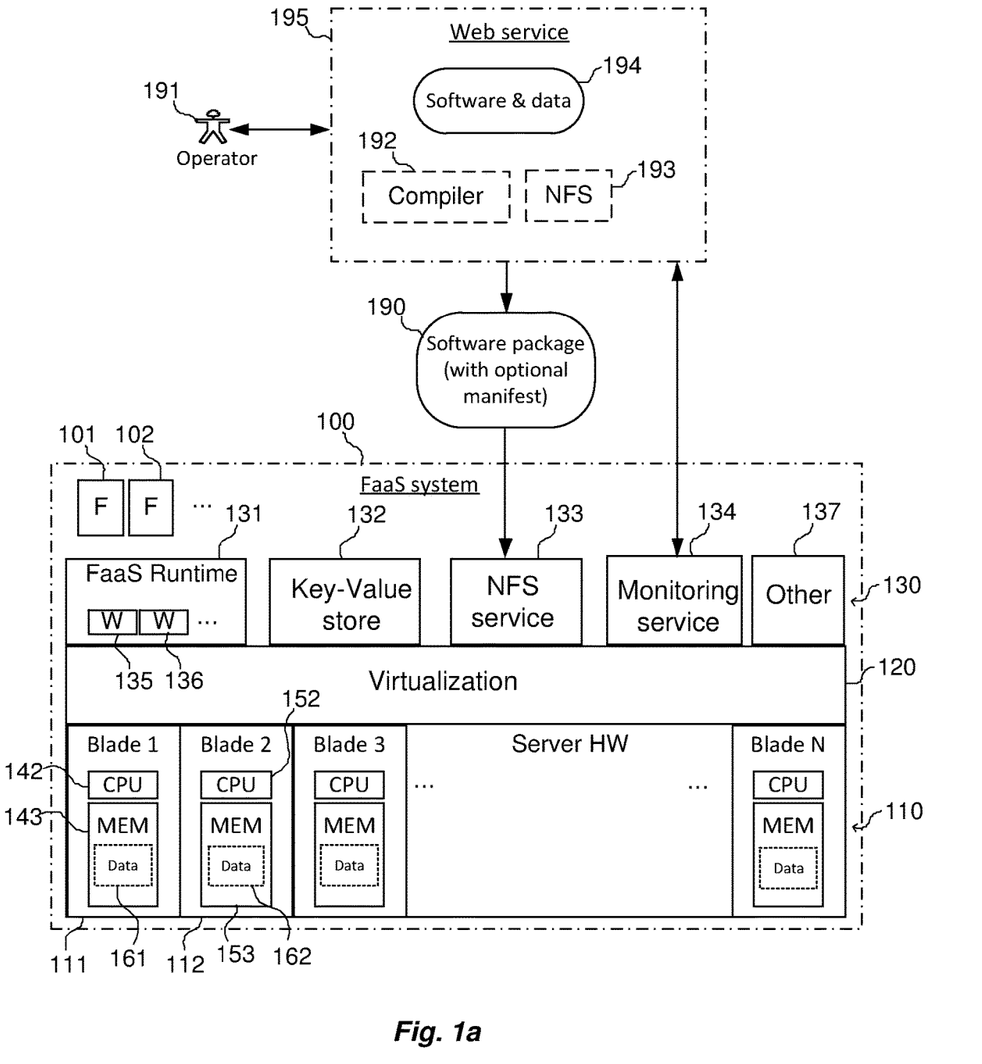
FIGS. 1a and 1b schematically illustrate a FaaS system.

Turning first to FIG. 1a, a FaaS system 100 comprises hardware 110 in the form of a plurality of server blades, two of which 111, 112 are enumerated in FIG. 1a. The total number of server blades in the hardware 110 may be several thousands. Each server blade 111, 112 comprises processing circuitry in the form of at least one processor 142, 152 and memory 143, 153 that holds data 161, 162. The data 161, 162 is illustrated in a conceptual manner and it is to be understood that data 161, 162 represent all types of data, including software instructions and data that is utilized by various functions and services that are executed in the FaaS system 100 by the processors 142, 152 in the server blades 111, 112.

A virtualization layer 120 is a software layer that is used, e.g., for enabling multiple services (e.g. a FaaS runtime and a KVS instance) on the same server blade with proper separation. Also, the virtualization layer "hides" the detailed configuration of the hardware 110, i.e. the layer 120 presents a unified view to upper layers even though the server blades 112, 112 may not be identical.

Figure 1B:
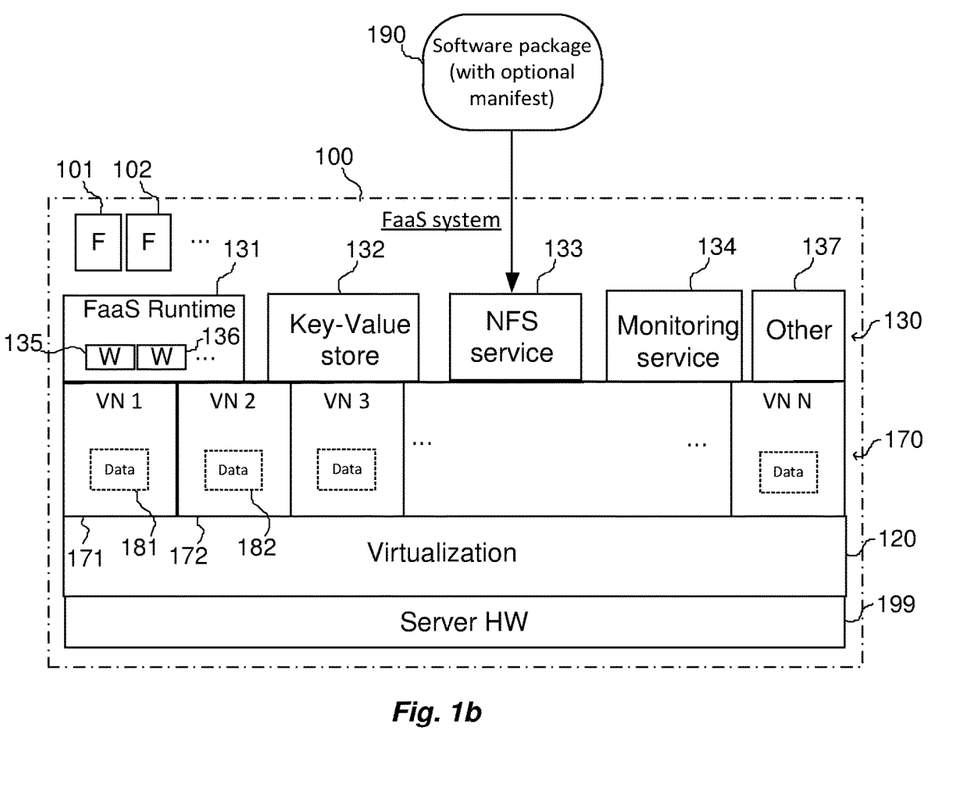

As illustrated in FIG. 1b, the FaaS system 100 may be illustrated in a manner where server hardware 199 is represented as a layer above which a plurality of execution nodes 171, 172 are realized. The execution nodes 171, 172 are associated with respective data 181, 182 (whose actual storage and processing circuitry are realized in the server hardware 199) and it is to be understood that the execution nodes 171, 172 and the associated data 181, 182 take the same role as the server blades 111, 112 illustrated in FIG. 1a. In FIG. 1b, the execution nodes 171, 172 are denoted VN1 and VN2, respectively, which is to indicate that they are to be considered as "virtual nodes" or "virtual machines" that are under the control of functionality in the virtualization layer 120. That is, the virtualization layer 120 may be seen as "hiding" the hardware 199 and enabling multiple virtual execution nodes on the same server blade with proper separation.

In the following, reference will be made to execution nodes and it is to be understood that the term "execution node" may correspond to "server blade".

The FaaS system 100 runs a plurality of services 130 on top of the virtualization layer 120: one or more FaaS runtime controllers 131 that utilize worker processes 135, 136. The workers 135, 136 realize the desired operation of functions 101, 102 when the functions 101, 102 are executed as described herein.

The FaaS runtime controller 131 starts worker processes 135, 136 on demand (based on the load in the system 100 for example). It also makes attachments (i.e. which worker 135, 136 should run which function on which trigger). It may also act as a proxy between the external world and the workers 135, 136, for example if Hypertext Transfer Protocol (HTTP) triggers are used the FaaS runtime controller 131 operates a webserver and proxies the request between users, e.g. the operator 191, and the workers 135, 136. In the present disclosure, workers are attached directly to keys in the key value store 132.

The workers 135, 136 contain the software package of one or more functions 101, 102 and they are capable of executing the functions 101, 102 when the trigger arrives. The workers 135, 136 also ensure that the functions 101, 102 have access to external stores such as the KVS 132 as illustrated here.

If a new version of a function is uploaded the FaaS runtime controller 131 usually starts new workers with the new version of the function and stop the old ones. It may be possible to update the function only in an active worker.

One or more key-value store databases 132 keep track of data such as key-value pairs that the functions 101, 102 use during execution. A network file service (NFS) 133 operates as an interface with external entities such as a web service 195 via which an operator 191 provides a software package 190 that comprises the function 101 and an optional manifest of information as will be discussed in more detail below. Creation of the software package 190 may take place, under the control of the operator 191, in the context of the web service 195 involving a software and data source 194, a compiler 192 and an NFS client 193. Any details regarding operation of the web service 195 including creation of the software package 190 is outside the scope of the present disclosure.

A monitoring service 134 operates as an interface, via the web service 195, for the operator 191 when interacting with the FaaS system 100, e.g. during interaction with the function 101 when the function 101 is executing.

The FaaS system 100 may comprise many other services and functions that operate on top of the virtualization layer 120. Such other services are represented in FIGS. 1a and 1b by the other service 137.

As the skilled person will realize, the actual execution of the FaaS runtime controller 131, workers 135, 136, functions 101, 102, key-value store 132, NFS service 133 and the monitoring service 134 is realized by means of the server blades 111, 112 and the execution nodes 181, 182 with their associated data 161, 162, 191, 192.

As discussed above, functions such as the function 101 in the FaaS system 100 are stateless and as a result the FaaS system 100 can use a different FaaS runtime controller 131 for each execution of a particular function. Statelessness means, in the present context, that the function 101 does not store states internally, but use the key-value store 132, for this purpose. Accessing the key-value store 132 from the function 101 is an expensive operation (e.g. in terms of latency), especially if the function 101 is executed on a physically different server (i.e. any of the server blades 110) compared to the location of the given data element stored by the key-value store 132.

Below will follow a description of embodiments of a method for the FaaS runtime controller 131 to determine the (physical) location of data elements that will be accessed during a specific execution of the function 101. The location information is used to decide which execution node 111, 112, 171, 172 should be used for best performance (e.g. less remote data accesses and thereby less latency) for the given execution of the function 101.

The key-value store 132 is a fast, in-memory key-value store that knows where each value is stored among the execution nodes (e.g. server blades, virtual machines) 111, 112, 171, 172 participating in the key-value store 132. It is assumed that the function 101 is attached to and triggered by events. The function 101 may be attached to a key in the key-value store 132 and trigger when the value of the key changes (or the key is created or deleted). Other triggering mechanisms may be: a timer elapses (periodic triggering); an external message arrives (such as an HTTP request); a system-wide event happens (e.g. a new user added); etc. Most of these can actually be also expressed as a change in the key-value store 132, if these events are stored into keys.

Figure 2A:
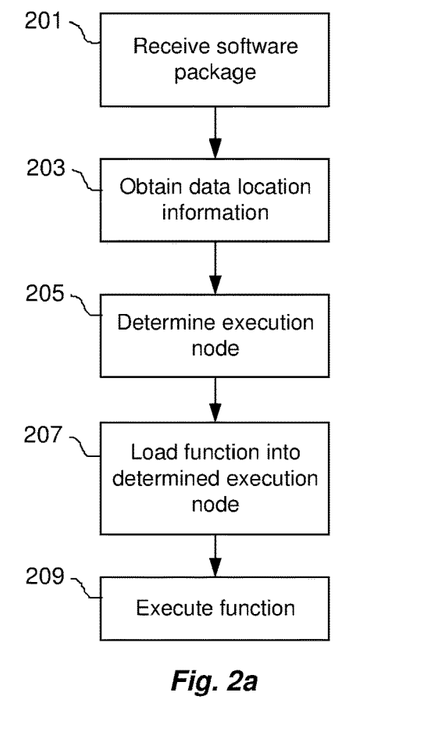
FIGS. 2a-d are flowcharts of methods,
FIG. 3 schematically illustrates a computer system, and
FIG. 4 schematically illustrates a computer system.

Turning now to FIG. 2a and with continued reference to FIGS. 1a and 1b, embodiments of a method performed by the FaaS system 100 will be described in some detail. In such embodiments, the method comprises a number of actions as follows:

Action 201

The software package 190 comprising the function 101 that is to be executed in the FaaS system 100 is received.

Action 203

Data location information related to data that the function 101 is going to access during execution is obtained.

Action 205

Based on the data location information obtained in action 203, a determination is made of an execution node 111, 181 in which the function 101 is to be executed.

In some embodiments, this determination action 205 comprises determining that the execution node 111, 171 is a node in which data that the function 101 is going to access during execution is located.

In some embodiments, this determination action 205 comprises determining that the execution node 111, 171 is a node in which at least one process is executing and is accessing the data that the function 101 is going to access during execution. This may be realized, for example, by storing information about the locality decisions at previous activations of the function itself so that it is possible to look up which other functions use the same piece of data. Another example is one in which, e.g., a dedicated monitoring process, e.g. one of the other services 137, in the FaaS system 100 monitors accesses to data and collect those into a data store. Such an approach has an advantage in that it may provide a fine grained and up to date information about which data the function 101 is going to access during execution.

Action 207

The function 101 is loaded into the determined execution node 111, 171.

Action 209

The function 101 is executed in the determined execution node 111, 171.

Figure 2B:
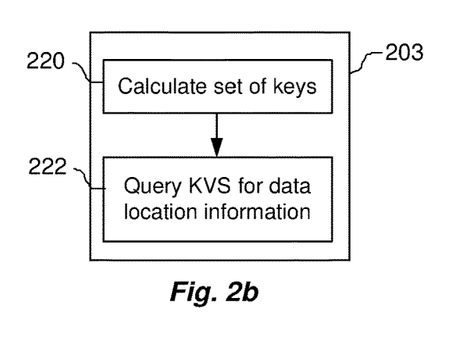

With reference to FIG. 2b, in some embodiments, the software package 190 comprises information related to a trigger for the function 101.

In such embodiments, the step of obtaining 203 data location information comprises a number of actions as follows:

Action 220

A calculation is made, using the information related to a trigger, of a set of one or more keys for retrieving values from the key-value store 132 during the execution action 209 of the function 101.

Action 222

The key-value store 132 is queried for the data location information, using the set of one or more keys calculated in action 220.

In some of the embodiments illustrated in FIG. 2b, the information related to a trigger for the function 101 may comprise a key that is a trigger for the function 101 and a replacing regular expression that defines data that the function 101 is going to access during execution.

In some of the embodiments illustrated in FIG. 2b, the information related to a trigger for the function 101 may comprise a key that is a trigger for the function 101 and a software function configured to identify data that the function 101 is going to access during execution. For example, the software function may be configured to calculate a list of tuples comprising a key that is a trigger for the function and at least one identifier of data that the function 101 is going to access during execution.

In other words, the embodiments illustrated in FIG. 2b are embodiments wherein the uploaded software package 190 that comprises the function 101 also contains a manifest (i.e. the information related to a trigger) that is used by the FaaS runtime controller 131 to calculate the keys the function 101 will work on. If the function 101 is attached to a key, the name key and the given value can be used in the manifest.

The manifest may be in different forms, for example it may be in the form of a replacing regular expression. This can be used if there is a simple relation between the trigger and the accessed keys. For example, if the function 101 is triggered on a key A.B and it will access values A.C and A.D. These types of expressions can be evaluated at a time when the function 101 is activated.

The manifest may also be in the form of a small procedural description (a small function itself that calculates the keys). For example, a simple python or C routine can be provided taking the trigger key name as input and returning a list of key names. For example, a list of match/output tuples may be returned. This can be seen as a generalized version of the regular expression mentioned above, where matches can still be regular expressions, but the value to replace can explicitly be listed.

Figure 2C:
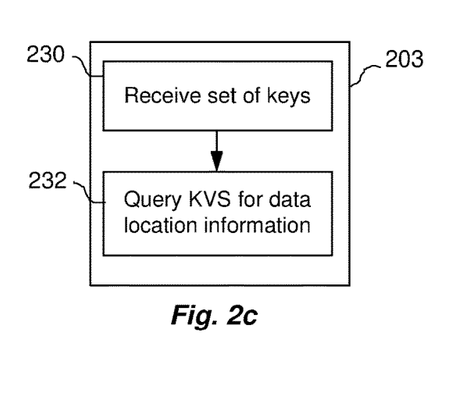

With reference to FIG. 2c, in some embodiments, the obtaining of data location information in action 203 comprises a number of action as follows:

Action 230

A set of one or more keys are received, these keys for retrieving values from the key-value store 132 during the execution action 209 of the function 101.

Action 232

The key-value store 132 is queried for the data location information, using the set of one or more keys received in action 230.

In other words, the embodiments illustrated in FIG. 2c are embodiments wherein the uploaded software package 190 that comprises the function 101 does not comprise a manifest as in the embodiments described in connection with FIG. 2b. Instead, in the embodiments illustrated by FIG. 2c, a set of keys are provided to the function 101 when the function 101 is activated as part of an activation procedure. At this point the entity that activates the function 101 fully knows the trigger key.

It is to be noted that, with regard to the embodiments illustrated in FIG. 2b and FIG. 2c, it is not essential to consider all keys that the function 101 will work on—it is enough to consider only the keys that are relevant for the function's 101 placement (i.e. where it is executed) for performance reasons. Keys that are accessed by many functions and are difficult to handle from a location optimization perspective may be omitted.

Figure 2D:
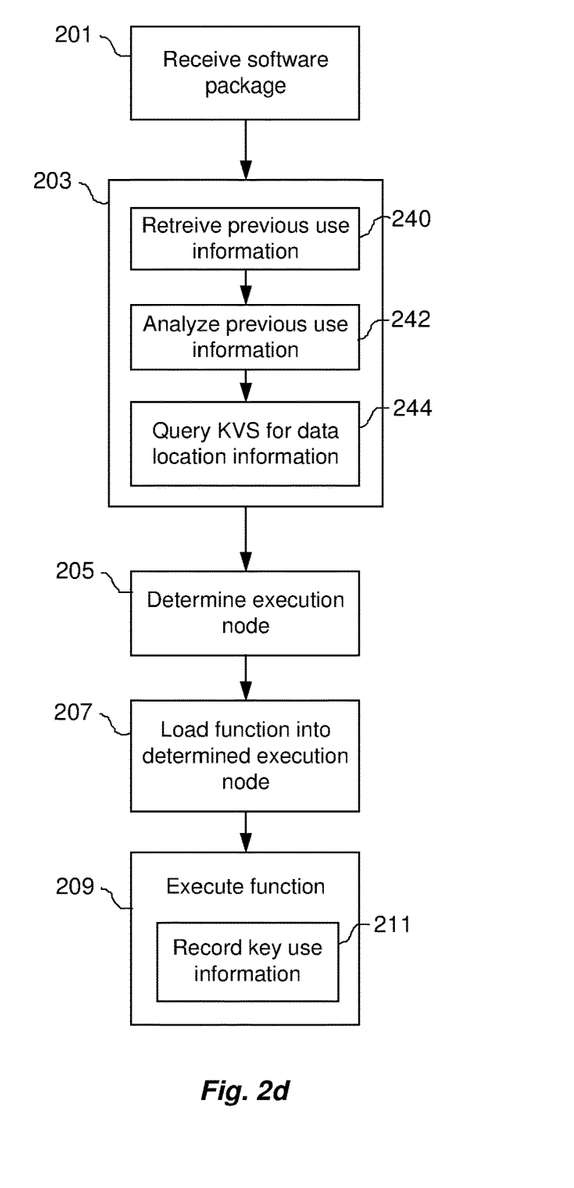

With reference to FIG. 2d, in some embodiments, during the execution action 209 of the function 101, information is recorded (in an action 211) regarding which keys the function 101 uses during the execution action 209. In these embodiments, the obtaining of data location information in action 203 comprises a number of actions as follows:

Action 240

Information regarding which keys the function 101 has used during previous executions is retrieved.

Action 242

The retrieved information regarding which keys the function 101 has used during previous executions is analyzed.

For example, in some embodiments, the analysis in action 242 may comprise counting a respective number of times keys have been accessed during previous executions and returning a result that identifies a key that has been accessed a number of times that is largest.

For example, in some embodiments, the analysis in action 242 may comprise calculating a respective size of data sets associated with keys that have been accessed during previous executions and returning a result that identifies a key that is associated with a largest dataset.

Action 244

The key-value store 132 is queried for the data location information, using a result from the analysis action 242.

In other words, the embodiments illustrated in FIG. 2d are embodiments wherein measuring (counting) takes place of which keys the function 101 activated for a certain trigger actually use during its execution. After the function 101 finished, "post-mortem" knowledge is obtained of where the function 101 would have been best executed. Assuming that functions activated for a certain trigger will access similar keys on each firing of the trigger, these keys can be learned.

An example of how various embodiments of the method described above may be applied is one wherein a software developer (e.g. the operator 191) creates and uploads functionA with a manifest to the FaaS system 100. The functionA is then activated for some users in the system by attaching it to user keys (e.g. userA). During attachment, the provided manifest is evaluated by the FaaS system 100 and it may determine that functionA will access some user specific keys (e.g. userA.X, userA.Y). Having the list of keys, the system 100 can query the location and attach the functionA to userA key at the best location, i.e. at the best server blade 111 or node 171. For example if userA.X and userA.Y are stored by the same node of the key-value store 132 it is best to create the attachment at that node, i.e. execute functionA in that node. If the key-value database 132 is capable of data movement, during the attachment process the userA.X and userA.Y keys may be moved to the same node if they were not co-located before this attachment.

Another example of how various embodiments of the method described above may be applied is one involving a hypothetical mobile network. In such an example, two functions trigger on the key "Core_Network.state.userID" the value of which would be rewritten every time a specific user goes active or idle (for example). Then an analytics function can trigger on every state change updating a few key performance indicators (KPI) about user activity stored under the keys Core_Network.KPI1.userID and Core_Network.KPI2.userID. A second function, doing charging can also trigger and update a Charging Data Record (CDR) stored under the key named Core_Network.UsageCDR.userID.

In this example an analytics function (as exemplified in connection with FIG. 2b) may have two regular expressions, which could replace the string "Core_Network.state." in the trigger key name to "Core_Network.KPI1." and "Core_Network.KPI2." respectively, which then can be used for locality optimization purposes (i.e. determining in which execution node the functions are to be executed).

Figure 3:
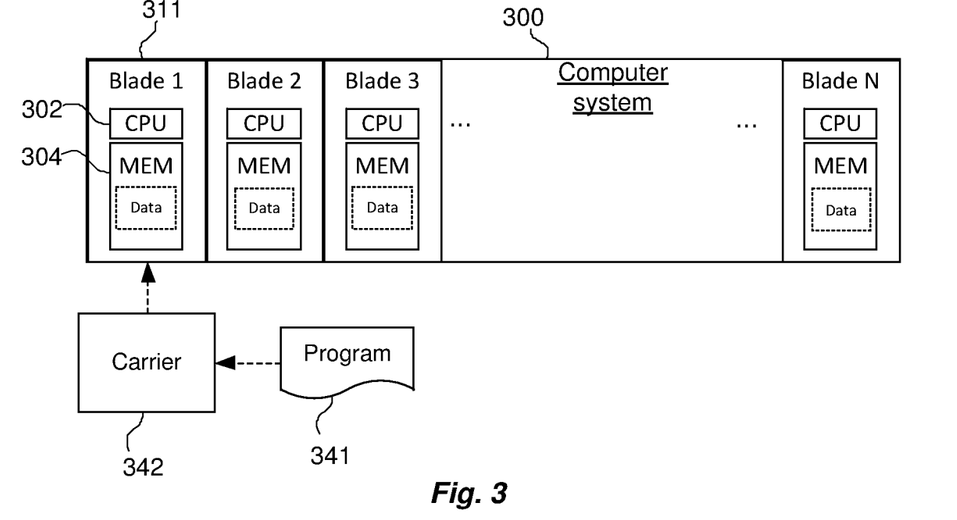

Turning now to FIG. 3, and with continued reference to FIGS. 1a-b, a computer system 300 will be described in some detail. The computer system 300, which may correspond to at least part of the FaaS system 100 in FIGS. 1a-b, comprises a plurality of server blades 311 that comprise a processor 302 and a memory 304. The memory 304 contains instructions executable by the processor 302 whereby the computer system 300 is operative to:
  receive a software package 190 comprising a function 101 that is to be executed in the computer system 300,
  obtain data location information related to data that the function 101 is going to access during execution,
  determine, based on the data location information, an server blade 311 in which the function 101 is to be executed,
  load the function 101 into the determined server blade 311, and
  execute the function 101 in the determined server blade 311.

The instructions that are executable by the processor 302 may be software in the form of a computer program 341. The computer program 341 may be contained in or by a carrier 342, which may provide the computer program 341 to the memory 304 and processor 302. The carrier 342 may be in any suitable form including an electronic signal, an optical signal, a radio signal or a computer readable storage medium.

In some embodiments, the computer system 300 is operative such that the determination of an execution node 111, 171 in which the function 101 is to be executed comprises determining that the execution node 111, 171 is a node in which data that the function 101 is going to access during execution is located.

In some embodiments, the computer system 300 is operative such that the determination of an execution node 111, 171 in which the function 101 is to be executed comprises determining that the execution node 111, 171 is a node in which at least one process is executing and is accessing the data that the function 101 is going to access during execution.

In some embodiments, the computer system 300 is operative such that the software package 190 comprises information related to a trigger for the function 101, and operative such that the obtaining of data location information comprises:
  calculating, using the information related to a trigger, a set of one or more keys for retrieving values from a KVS 132 during the execution of the function 101, and
  querying the KVS 132, using the calculated set of one or more keys, for the data location information.

In some embodiments, the computer system 300 is operative such that the information related to a trigger for the function 101 comprises:
  a key that is a trigger for the function 101, and
  a replacing regular expression that defines data that the function 101 is going to access during execution.

In some embodiments, the computer system 300 is operative such that the information related to a trigger for the function 101 comprises:
  a key that is a trigger for the function 101, and
  a software function configured to identify data that the function 101 is going to access during execution.

In some embodiments, the computer system 300 is operative such that the software function is configured to calculate a list of tuples comprising:
  a key that is a trigger for the function 101, and
  at least one identifier of data that the function 101 is going to access during execution.

In some embodiments, the computer system 300 is operative such that the obtaining of data location information comprises:
  receiving a set of one or more keys for retrieving values from a KVS 132 during the execution of the function 101, and
  querying the KVS 132, using the received set of one or more keys, for the data location information.

In some embodiments, the computer system 300 is operative, during the execution of the function 101, to:
  record information regarding which keys the function 101 uses during the execution, and
wherein the obtaining of data location information comprises:
  retrieving information regarding which keys the function 101 has used during previous executions,
  analyzing the retrieved information regarding which keys the function 101 has used during previous executions, and
  querying the KVS 132, using a result of the analysis, for the data location information.

In some embodiments, the computer system 300 is operative such that the analysis comprises:
  counting a respective number of times keys have been accessed during previous executions, and
  returning a result that identifies a key that has been accessed a number of times that is largest.

In some embodiments, the computer system 300 is operative such that the analysis comprises:
  calculating a respective size of data sets associated with keys that have been accessed during previous executions, and
  returning a result that identifies a key that is associated with a largest dataset.

Figure 4:
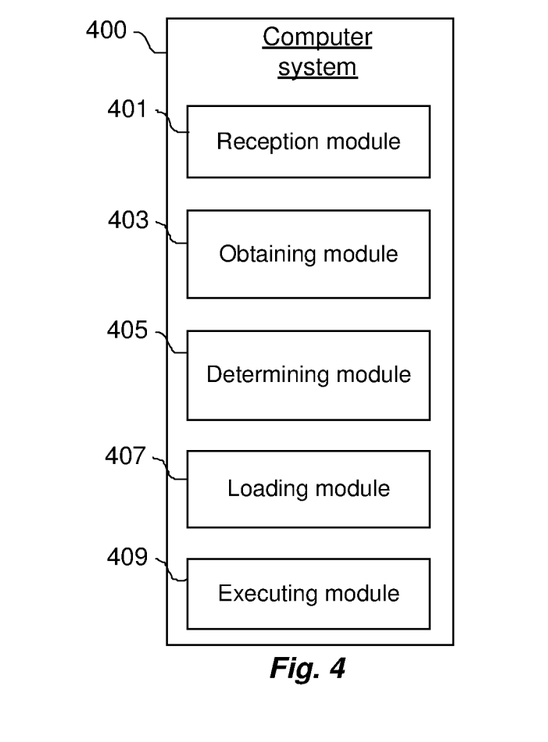

Turning now to FIG. 4, a computer system 400 will be described in some detail. The computer system 400, which may correspond to the FaaS system 100 in FIG. 1a-b, comprises:
  a receiving module 401 configured to receive a software package 190 comprising a function 101 that is to be executed in the computer system 300,
  an obtaining module 403 configured to obtain data location information related to data that the function 101 is going to access during execution,
  a determining module 405 configured to determine, based on the data location information, an server blade 311 in which the function 101 is to be executed,
  a loading module 407 configured to load the function 101 into the determined server blade 311, and an executing module configured to execute the function 101 in the determined server blade 311.

The computer system 400 may comprise further modules that are configured to perform in a similar manner as, e.g., the computer system 300 described above in connection with FIG. 3.

The invention claimed is:

1. A method performed by a function as a service, FaaS, system, said FaaS system comprising a plurality of execution nodes, the method comprising:
receiving a software package comprising a function that is to be executed in the FaaS system,
obtaining data location information related to data that the function is going to access during execution,
determining, based on the data location information, an execution node in which the function is to be executed,
loading the function into the execution node,
executing the function in the execution node; and
during the execution of the function, recording information regarding which keys the function uses during the execution,
wherein the step of obtaining data location information comprises:
retrieving information regarding which keys the function has used during previous executions,
analyzing the retrieved information regarding which keys the function has used during previous executions, and
querying a key-value store (KVS), using a result of the analysis, for the data location information.

2. The method of claim 1, wherein the determination of the execution node in which the function is to be executed comprises determining that the execution node is a node in which data that the function is going to access during execution is located.

3. The method of claim 1, wherein the determination of the execution node in which the function is to be executed comprises determining that the execution node is a node in which at least one process is executing and is accessing the data that the function is going to access during execution.

4. The method of claim 1, wherein the software package comprises information related to a trigger for the function, and the step of obtaining data location information comprises:
calculating, using the information related to the trigger, a set of one or more keys for retrieving values from the KVS, during the execution of the function, and
querying the KVS, using the set of one or more keys, for the data location information.

5. The method of claim 1, wherein the step of obtaining data location information comprises:
receiving a set of one or more keys for retrieving values from the KVS, during the execution of the function, and
querying the KVS, using the set of one or more keys, for the data location information.

6. The method of claim 1, wherein the analysis comprises:
counting a respective number of times keys have been accessed during previous executions, and
returning a result that identifies a key that has been accessed a number of times that is largest.

7. The method of claim 1, wherein the analysis comprises:
calculating a respective size of data sets associated with keys that have been accessed during previous executions, and
returning a result that identifies a key that is associated with a largest dataset.

8. A computer system comprising a plurality of server blades, each server blade comprising a processor and a memory, said memory containing instructions executable by said processor whereby said computer system is operative to:
receive a software package comprising a function that is to be executed in the computer system
obtain data location information related to data that the function is going to access during execution,
determine, based on the data location information, a server blade in which the function is to be executed,
load the function into the server blade,
execute the function in the server blade; and
during the execution of the function, record information regarding which keys the function uses during the execution;
wherein the obtaining of data location information comprises:
retrieving information regarding which keys the function has used during previous executions,
analyzing the retrieved information regarding which keys the function has used during previous executions, and
querying a key-value store (KVS), using a result of the analysis, for the data location information.

9. The computer system of claim 8, operative such that the determination of the execution node in which the function is to be executed comprises determining that the server blade is a node in which data that the function is going to access during execution is located.

10. The computer system of claim 8, operative such that the determination of the execution node in which the function is to be executed comprises determining that the server blade is a node in which at least one process is executing and is accessing the data that the function is going to access during execution.

11. The computer system of any claim 8 operative such that the software package comprises information related to a trigger for the function, and operative such that the obtaining of data location information comprises:
calculating, using the information related to the trigger, a set of one or more keys for retrieving values from the KVS, during the execution of the function, and
querying the KVS, using the set of one or more keys, for the data location information.

12. The computer system of claim 11, operative such that the information related to the trigger for the function comprises:
a key that is the trigger for the function, and
a replacing regular expression that defines data that the function is going to access during execution.

13. The computer system of claim 11, operative such that the information related to the trigger for the function comprises:
a key that is the trigger for the function, and
a software function configured to identify data that the function is going to access during execution.

14. The computer system of claim 13, operative such that the software function is configured to calculate a list of tuples comprising:
a key that is the trigger for the function, and
at least one identifier of data that the function is going to access during execution.

15. The computer system of claim 8, operative such that the obtaining of data location information comprises:

receiving a set of one or more keys for retrieving values from the KVS, during the execution of the function, and querying the KVS, using the received set of one or more keys, for the data location information.

16. The computer system of claim 8, operative such that the analysis comprises:

counting a respective number of times keys have been accessed during previous executions, and returning a result that identifies a key that has been accessed a number of times that is largest.

17. The computer system of claim 8, operative such that the analysis comprises:

calculating a respective size of data sets associated with keys that have been accessed during previous executions, and returning a result that identifies a key that is associated with a largest dataset.

18. A non-transitory computer readable storage medium comprising instructions which, when executed by a function as a service, FaaS, system cause the FaaS system to:

receive a software package comprising a function that is to be executed in the FaaS system, obtain data location information related to data that the function is going to access during execution, determine, based on the data location information, an execution node in which the function is to be executed, loading the function into the execution node, executing the function in the execution node; and during the execution of the function, recording information regarding which keys the function uses during the executions;

wherein the step of obtaining data location information comprises:

retrieving information regarding which keys the function has used during previous executions, analyzing the retrieved information regarding which keys the function has used during previous executions, and querying a key-value store (KVS), using a result of the analysis, for the data location information.

* * * * *